United States Patent [19]
Heubner

[11] Patent Number: 5,816,668
[45] Date of Patent: Oct. 6, 1998

[54] VALVE APPARATUS FOR A NON-MUSCULAR-ENERGY-ASSISTED BRAKE CIRCUIT IN A HYDRAULIC BRAKE SYSTEM

[75] Inventor: Wilhelm Heubner, Kaltenbrunn, Germany

[73] Assignee: Fahrzeugtechnik Ebern GmbH, Germany

[21] Appl. No.: 709,680

[22] Filed: Sep. 9, 1996

[30] Foreign Application Priority Data

Dec. 9, 1995 [DE] Germany .................. 195 33 482.5

[51] Int. Cl.⁶ .................................................. B60T 8/34
[52] U.S. Cl. ................................. 303/116.2; 303/115.2
[58] Field of Search ........................... 303/113.1, 113.2, 303/115.2, 116.1, 116.2, 122.19, 122

[56] References Cited

U.S. PATENT DOCUMENTS

| | | |
|---|---|---|
| 4,892,364 | 1/1990 | Burgdorf . |
| 5,135,292 | 8/1992 | Friedow . |
| 5,188,436 | 2/1993 | Devall ................................. 303/115.2 |
| 5,354,123 | 10/1994 | Albert ................................. 303/115.2 |
| 5,538,336 | 7/1996 | Reuter et al. ...................... 303/116.2 |
| 5,658,057 | 8/1997 | Ohnuma et al. .................... 303/116.2 |

FOREIGN PATENT DOCUMENTS

| | | |
|---|---|---|
| 0 356 669 A1 | 3/1990 | European Pat. Off. . |
| 1 134 904 | 8/1962 | Germany . |
| 24 50 874 | 5/1975 | Germany . |
| 37 05 311 A1 | 9/1988 | Germany . |
| 38 13 172 A1 | 11/1989 | Germany . |
| 39 05 044 A1 | 8/1990 | Germany . |
| 43 44 580 A1 | 6/1995 | Germany . |
| 1 468 014 | 3/1977 | United Kingdom . |
| 2 086 506 | 5/1982 | United Kingdom . |
| 2 201 208 A | 8/1988 | United Kingdom . |
| WO 89 09711 | 10/1989 | WIPO . |

Primary Examiner—Matthew C. Graham
Attorney, Agent, or Firm—McAndrews, Held & Malloy, Ltd.

[57] ABSTRACT

A valve apparatus for a non-muscular-energy-assisted brake circuit of a hydraulic brake system is disclosed. The apparatus has a restriction valve whose valve body in a controlled manner limits a restriction gap through which a hydraulic fluid is forced in non-muscular-energy-assisted braking operation in order to establish a defined dynamic pressure in a pressure chamber in which a valve plunger having a through-hole is provided. The dynamic pressure can be applied to a tensioner. If the non-muscular-energy assistance fails, the valve plunger can be closed to generate a residual braking pressure in the pressure chamber using the valve body when the through-hole is closed. Since the restriction gap is located at the through-hole, a very compact valve apparatus is created, in which the valve body not only limits the restriction gap but also serves as a sealing closure element for the through-hole and serves to directly control the valve plunger, while the brake pressure in the pressure chamber is present at all times directly at the valve body and therefore can be fed back in a desirable manner to the brake pedal.

7 Claims, 4 Drawing Sheets

VALVE APPARATUS FOR A NON-MUSCULAR-ENERGY-ASSISTED BRAKE CIRCUIT IN A HYDRAULIC BRAKE SYSTEM

BACKGROUND OF THE INVENTION

1. Field of the Invention

The present invention relates generally to hydraulic brake systems. More specifically, a valve arrangement for a non-muscular-energy-assisted brake circuit in a hydraulic brake system is disclosed. In particular, the invention relates to a valve apparatus by means of which the non-muscular-energy is applied at the tensioning means by means of a dynamic pressure generated with a hydraulic fluid when the fluid flows through a restriction gap which can be set in a defined manner by adjusting the restriction gap, and which, if the non-muscular-energy assistance fails, can apply a defined residual braking force to the tensioning means with low hardware expense and complexity.

2. Description of the Related Art

Currently, hydraulic braking systems for automotive vehicles are typically designed as energy-assisted or non-muscular-energy-assisted braking systems. With an energy-assisted braking brake system, the energy required to generate the braking force is derived from the physical strength of the driver and one or more energy-supply devices. In other words, in the braking operation, part of the braking force is applied by means of a manually operated master cylinder which is connected to a manually operated brake pedal directly at the tensioning means, while the other part of the braking force is applied as a power-assisted force, for example from a hydraulic pump. By contrast, with a non-muscular-energy-assisted brake system, the energy required to generate the braking force is obtained from one or more energy-supplying devices, but not with the physical strength of the driver. In other words, the master cylinder which is connected to the brake pedal is not used to apply the braking force directly to the tensioning means, but rather to control the servo power applied to the tensioning means. Both types of brake systems have a power-/non-muscular-energyassisted brake circuit.

DE-AS 1,134,904 discloses a brake booster for a non-muscular-energy-assisted brake system in which the boost force is generated by a hydraulic recirculating system. For this purpose, the brake booster has a pressure chamber attached to the outlet of a hydraulic pump. The pressure chamber is connected to the tensioning means, and is connected to a drain chamber connected to a reservoir. This braking chamber is connected to the pressure chamber via a restriction valve. The restriction valve has a valve body, which, together with a bushing arranged in a fixed position in the brake booster, limits the restriction gap or valve gap of the restriction valve and is connected to the brake pedal, so that the valve gap of the restriction valve can be adjusted depending on the position of the brake pedal in order to generate in the pressure chamber a dynamic pressure which is proportional to the brake pedal travel. The dynamic pressure is applied to the tensioning means by means of a plunger which is provided in the pressure chamber having a through-hole. The dynamic pressure also presses back onto the brake pedal through the hydraulic effective surface of the valve body which faces the plunger. This feedback of the dynamic pressure which is present at the restriction valve back to the brake pedal permits the brake pedal to be operated in a manner that gives the driver a good sense of what is happening. The brake pressure prevailing in the tension means is taken into account.

If the hydraulic pump fails, mechanical control of the brake circuit can be accomplished to generate the necessary braking force at the tensioning elements. An additional valve element is provided for this purpose. This valve element can be brought into contact with the valve body if the valve body is moved into the bushing far enough so that the restriction valve is closed. The additional valve element can now be moved against the force of a return spring in the direction of the plunger which is located in the pressure chamber. This is accomplished by means of the valve body. The through-hole in the plunger is closed by this action, so that the tension means can be controlled by the plunger.

Even though the feedback of the dynamic pressure to the brake pedal permits the brake system to be operated in a way which gives the driver a good sense of what is going on, this prior art has the disadvantage that the integration of the residual braking function in the brake booster is accomplished using a large number of components and is relatively expensive and elaborate in terms of hardware and uses a large design package.

Such brake boosters which utilize the dynamic force principle with a restriction valve are also disclosed for use in energy-assisted brake systems. For example, DE-PS 1,180,259 describes a brake booster which differs from the brake booster described above essentially in that the plunger located in the pressure chamber is mechanically actuated by the valve body connected to the brake pedal, even in normal brake operation. While instead of the additional valve element, a check valve is located in the through-hole of the plunger. The check valve is preloaded in its closed position in opposition to the direction in which the valve body is actuated, and it only allows the hydraulic fluid to travel in the direction of the tensioning means.

In addition, an additional pressure chamber containing an additional plunger is provided. This additional pressure chamber is located between the valve body of the restriction valve and the plunger in the pressure chamber so that it can apply a reaction force which is proportional to the dynamic pressure to the valve body and thus to the brake pedal.

A disadvantage of this brake booster is that not only the integration of the residual braking function in the brake booster, but also the feedback of the dynamic pressure applied at the restriction valve to the brake pedal requires elaborate and expensive hardware. In other words, a large number of components and, on the valve side, a large design space are required. Moreover, when the brake pedal is pushed, the mass of the additional plunger also needs to be moved. Also, the frictional force between the additional plunger and the inner wall of the additional pressure area has to be overcome, which if the boost power fails, further increases the braking force needed to generate the required residual braking force at the brake pedal.

Furthermore, DE-PS 1,037,287 has a brake booster for a non-muscular-energy-assisted brake system in which the brake circuit is separated from the power circuit. In this system, the technology uses a restriction valve based on the dynamic pressure principle. A valve body extends through the drain chamber of this brake booster. One end of the valve body can be controlled hydraulically by the master cylinder connected to the brake pedal. The other end extends into the pressure chamber of the boost circuit. The valve body is provided with a centered blind hole in the end which extends into the pressure chamber of the power circuit. A transverse hole is provided in its base to connect the pressure chamber of the boost circuit with the drain chamber. The end of the valve body, which extends into the pressure chamber of the boost circuit, together with the closed base of a plunger piston, which is arranged concentric to the valve body and which closes itself off by means of a separating wall between the pressure chamber of the power circuit and the pressure chamber of the brake circuit, forms the restriction valve.

Even though this system has the advantage that by separating the power circuit from the brake circuit, a power-assist source which is already present in the vehicle can be used, for example with a different fluid for the boost circuit, one encounters problems here relating to the travel-dependent control of the valve gap of the restriction valve. The master cylinder-side hydraulic effective surface area of the valve body is too small to apply the necessary residual braking force with an appropriate actuating force applied to the brake pedal via the master cylinder if the boost power fails.

Furthermore, the hydraulic effective surface area of the valve body on the master cylinder side is so large that it requires a large hydraulic fluid capacity or large master cylinder travel with a correspondingly high operating force at the brake pedal in normal operation in order to adjust the valve gap of the restriction valve and, hence, the boost power. In addition, during normal operation, the closed-loop control process which takes place when the valve body is moved by the application of pressure via the master cylinder toward the plunger piston at the valve gap of the restriction valve causes the brake pedal, to which the actuation force is applied, to yield, which is also referred to as the "running-away" of the brake pedal. The result is that both in normal brake operation with power assistance and if the boost power fails, the brake pressure acting on the tensioning means cannot be adjusted with a sufficient degree of sensitivity by means of the brake pedal, so that good braking/pedal feel is lacking.

Finally, in DE 36 03 074 C2 or DE 37 02 573 A1, the use of electromagnetically controlled ball seat belts in pressure modulators for hydraulic brake systems having an anti-locking brake system (ABS) is disclosed in principle. With these pressure modulators, the ball seat valve functions as a control valve, whose valve ball can be moved directly by means of an electromagnetically adjustable pressure relief plunger of the pressure modulator, or indirectly by means of an electromagnet which is dedicated to this purpose in order to interrupt the connection between the master cylinder and the wheel cylinder, so that during ABS operation, the brake pressure in the wheel cylinder can be controlled by the pressure relief plunger independently of the pressure in the master cylinder.

In summary, the known energy-assisted or non-muscular energy-assisted brake systems in which the boost force is generated by a hydraulic pump using the dynamic pressure principle are found to be lacking with respect to the ability to provide satisfactory feedback of the brake pressure present in the tensioning means to the brake pedal, with respect to a favorable design integration of the residual braking function, as well as with respect to adequate actuating force at the brake pedal with sufficient brake force at the tensioning means.

SUMMARY OF THE INVENTION

In light of the systems described above, it is an object of the present invention to create a valve arrangement for a non-muscular-energy-assisted brake circuit of a hydraulic brake system which can be used to provide a sufficient braking force at the tensioning means with good pedal feel with a low hardware expense both in normal brake operation and in the event of failure of the boost power.

In accordance with an embodiment of the invention, the valve apparatus has a restriction valve with a valve body, which limits in a manner that can be controlled a restriction gap through which hydraulic fluid flows in non-muscular-energy-assisted braking operation in order to establish in a pressure chamber a defined dynamic pressure which can be applied to a tensioning means of the braking system in which a valve plunger having a through-hole is placed. If the non-muscular-energy provided for generating a residual brake pressure in the pressure chamber fails, the valve plunger can be moved over the valve body to seal off the through-hole, which forms a restriction gap at the through-hole of the valve plunger.

In accordance with an embodiment of the invention, a very compact valve apparatus design is provided in which the valve body not only limits the restriction gap but also, if the non-muscular energy assistance fails, serves as a closure element for the through-hole in the valve plunger and for directly controlling the valve plunger, while the dynamic force which is present in the pressure chamber or the brake pressure generated by the closed valve piston, in other words without interposing additional design elements, is present directly at the valve body. In this manner, good feedback to the brake pedal is provided. In non-muscular-energy-assisted brake operation, the continuous flow of hydraulic fluid through the open restriction gap results in particular in the elimination of control pressure spikes which could be passed on to the brake pedal.

In accordance with an embodiment of this invention, the valve body of the restriction valve of the valve apparatus can be controlled to adjust the restriction gap hydraulically and electromagnetically, so that anti-locking brake control (ABS) can be achieved. The hydraulically adjusted restriction gap is corrected electromagnetically in order to generate a dynamic pressure which adapts to braking conditions and which is applied to the tensioning means as the brake pressure.

A valve apparatus of an embodiment of the present invention has a restriction valve with an input control chamber. An input control plunger is located in the input control chamber so that it can move by sliding. The valve body can additionally be moved mechanically to adjust the restriction gap. As a result of its compact design, this embodiment is suitable, in particular, for integral brake systems on driven wheels in which the front wheel brake circuit and the rear wheel brake circuit can in principle be hydraulically controlled separately from one another, but in which the rear wheel brake circuit should also be controlled via the front wheel brake circuit.

In another embodiment, the restriction valve of the valve apparatus is designed as a ball seat valve having a spherical valve body which, together with an annular sealing seat on the through-hole of the valve plunger, limits the restriction gap. In addition to the fact that ball seat valves are relatively economical, the cross-sectional restriction area can be adjusted in a reliable and precise manner by means of a spherical valve body. In addition, a spherical valve body working in conjunction with an annular sealing seat is admirably suited for sealing the valve plunger, since the valve body can be self-centering on the sealing seat.

The elements of an embodiment of the present invention ensure that with dynamic pressure modulation at the restriction gap the valve body can be lifted from the sealing seat solely by the force of the circulating hydraulic fluid. This advantageously minimizes the actuation forces required to modulate the dynamic pressure.

Another embodiment of a valve apparatus reliably ensures that no undesirable feedback from the closed-loop control system to the brake pedal occurs by means of the control chamber. This characteristic is encountered with a low effort and low activation forces, even when the valve apparatus is in ABS mode.

Finally, still another embodiment of the valve apparatus is supplemented by an additional restriction valve, which is located in terms of the direction of hydraulic fluid flow, ahead of the pressure chamber of the first restriction valve. Its restriction gap can be adjusted electromagnetically independent of the restriction valve in order to generate a defined dynamic pressure, which can be applied to the tensioning means of the brake system. In this way, an anti-spin control system (ASC) or a vehicle dynamics control system can be integrated in the hydraulic brake system in a simple manner.

The invention is explained in greater detail both based on preferred embodiments and with reference to the drawings. Identical or similar parts are given the same reference numbers.

DETAILED DESCRIPTION OF THE PREFERRED EMBODIMENTS

Figure 1:
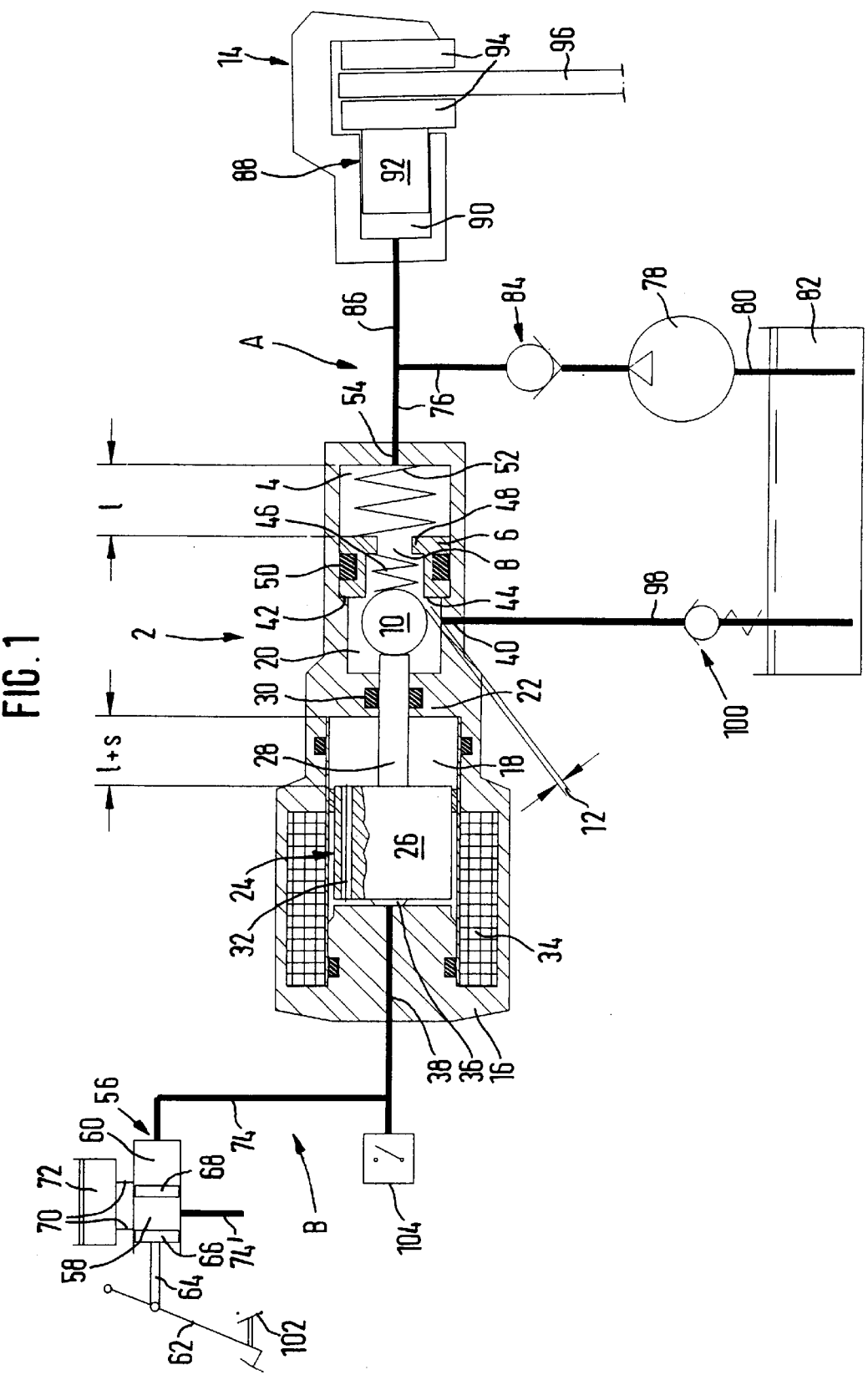
FIG. 1 is a schematic diagram of a first typical embodiment of the valve apparatus of the invention having a restriction valve whose valve body can be controlled hydraulically as well as electromagnetically for an anti-locking brake system (ABS).

In FIG. 1, an embodiment of a valve apparatus of the present invention is shown. The valve apparatus has a restriction valve 2, which has a pressure chamber 4, in which a valve plunger 6 that is able to move in a sliding manner is located. The valve plunger 6 has a through-hole 8 at which it, together with a valve body 10, forms a restriction gap 12. The restriction gap 12 has hydraulic fluid, preferably brake fluid, forced through it in the non-muscular-energy-supported brake operation mode, and can be moved by controlling the valve body 10 so that a defined dynamic pressure is generated in the pressure chamber 4. The dynamic pressure is applied to a brake caliper 14 of the brake system to generate a braking force. The brake caliper 14 serves as the tensioning means. If the non-muscular-energy assistance fails, the valve plunger 6 can be moved via the valve body 10 in the pressure chamber 4, whereby the valve body 10 closes the through-hole 8 so that a residual brake pressure is generated in the pressure chamber 4.

The restriction valve 2 is configured as a 2/2 ball seat valve. It has a 3-chamber valve housing 16 which defines, in addition to the pressure chamber 4, a control chamber 18 and a drain chamber 20, which are separated from one another by a wall 22 in the valve housing 16. A control plunger 24 is disposed in the control chamber 18 in such a way that it is free to slide. This control plunger 24 can be closed in the axial direction of the control chamber 18 by hydraulic means, or it can be driven electromagnetically for an anti-locking brake system (ABS). For this purpose, the control plunger 24 comprises an armature 26, which is guided in the control chamber 18, and a valve pin 28, which is disposed concentric to the armature 26. The valve pin 28 is sealed off by means of a sealing element 30, and it extends through the wall 22 between the control chamber 18 and the drain chamber 20 and projects into the drain chamber 20. As can be clearly seen in FIG. 1, the valve pin 28, which is a hydraulically guided in the wall 22 in such a way that a tight hydraulic seal is achieved, has a smaller diameter than the armature 26 of the control plunger 24. Basically, it is possible for hydraulic fluid to flow around the control plunger 24 on all sides in the control chamber 18. In order for this to occur, a hole 32 is formed in the armature 26. This hole 32 connects the left side of the armature 26 with the right side (as shown in FIG. 1).

A solenoid coil 34 is located in the area of the control housing which radially surrounds the control chamber 18. The solenoid coil 34 concentrically surrounds at least a portion of the armature 26 of the control plunger 24. The solenoid coil 34 is sealed from the control chamber 18 by means of a sleeve inserted in the control chamber 18 and by means of sealing elements (not provided with reference numbers in FIG. 1 for the sake of legibility). The restriction valve 2 can be driven by the solenoid drive comprising the armature 26 of the control plunger 24 and the solenoid coil 34 in order to vary the restriction gap 12 independently of the actuation of the brake pedal 62. The control plunger 24 is moved axially, as will be explained in greater detail below. The solenoid drive is designed to have an appropriate electrical current/force curve for this purpose.

A stop 36, which limits the travel of the control plunger 24 in the control chamber 18 in the leftward direction in FIG. 1, is formed in the control chamber 18 on the armature 26 on the side of the armature 26 opposite the drain chamber. Finally, the control chamber 18 has a connection which can be used to hydraulically control the control plunger 24. In the case shown here, in FIG. 1 the connection 38 ends in the control chamber 18, preferably concentric thereto, on the side of the control plunger 24 opposite the drain chamber 20. Since, when the restriction valve 2 is controlled hydraulically, hydraulic fluid essentially flows around the control plunger 24 by means of the hole 32 in the armature 26—in other words, since the same control pressure is present at all locations in the control chamber 18—the connection 38 could also extend radially through the valve housing 16 and terminate in the control chamber 18 on the side of the control plunger 24 opposite the drain chamber 20.

The valve body 10 is provided in the drain chamber 20 as a metal ball. This ball is sealed off by and can be mechanically loaded with a force by means of a valve pin 28 which passes through the wall 22 between the control chamber 18 and the drain chamber 20. The valve body 10 can have a compressive load applied to it only by means of the valve pin 28 of the control plunger 24, since the valve body 10 and the valve pin 28 are two separate components. In addition, the drain chamber 20 is provided with a connection 40, through which the hydraulic fluid can drain from the drain chamber 20.

A step 42 is provided between the drain chamber 20 and the pressure chamber 4 of the restriction valve 2. This step 42 provides a drain-chamber-side stop for the valve plunger 6 held in the pressure chamber 4 and located on the same axis as the control plunger 24. An annular sealing seat 44 is located at the drain chamber 20 with the through-hole 8 of the valve plunger 6 hydraulically connecting the pressure chamber 4. This angular sealing seat 44, like the through-hole 8, is concentrically aligned with the center axis of the valve plunger 6 and stops against and tightly seals with the valve body 10 in order to limit the restriction gap 12 with the valve body 10 or in the event of a loss of non-muscular energy assistance. A return spring 46 is located in the through-hole 8 of the valve body 6. This return spring 46 is supported by the shoulder 48 of the valve plunger 6, and it presses the valve body 10 against the valve pin 28 of the control plunger 24. The valve plunger 6 is provided with a sealing element 50 on its outer circumference so that only the restriction gap 12 hydraulically connects the pressure chamber 4 with the drain chamber 20 by means of the through-hole 8 of the valve plunger 6, or, in the event of a loss of non-muscular energy assistance, so that a residual brake pressure can be produced in the pressure chamber 4 after the valve body 10 has sealed off the through-hole 8 in the valve plunger 6 at the sealing seat 44.

A plunger spring 52 is provided in the pressure chamber 4 to preload the valve plunger 6 on the step 42 of the valve housing 16 with a force which is greater than the return force of return string 46. Finally, the pressure chamber 4 also has a connection 54.

The above description makes it clear that the restriction valve 2 is controlled in the non-controlled state in the open zero position in which the valve plunger 6 is preloaded against the shoulder 42 of the valve housing 16 by means of the piston plunger spring 52, while the return string 46, which is supported by the shoulder 48 of the valve plunger 6, presses the control plunger 24 against the stop 36 in the control chamber 18 by means of the positive connection between the valve body 10 and the valve pin 28, whereby the restriction gap 12 is opened to its maximum position. The possible travel of the control plunger 24 in the control chamber 18 is comprised of the closing distance s of the restriction gap 12, which the valve body 10 must traverse, until it has moved from its preloaded initial position to the point of contact on the sealing seat 44 of the valve plunger 6, and the travel 1 of the valve plunger 6, which the valve plunger 6 must cover until it has traversed from its preloaded initial position to the point of contact with the valve housing 16 on the end of the pressure chamber 4 facing away from the drain chamber 20.

The valve apparatus described above is integrated in the hydraulic brake systems as follows. The master cylinder 56—in the example shown here a tandem master cylinder which has two pressure chambers 58, 60 and can be actuated by means of the brake pedal 62—is used to hydraulically control the restriction valve 2 by means of the control plunger 24 which is guided in the control chamber 18. The brake pedal 62 is effectively connected by means of a piston rod 64 with a first plunger 66 of the master cylinder 56. The first plunger 66 hydraulically defines the first pressure chamber 58 of the master cylinder 56 on the brake pedal side. A second piston plunger 68 is located between the first pressure chamber 58 and the second pressure chamber 60 of the master cylinder 56. This second plunger 68 hydraulically separates the first pressure chamber 58 and the second pressure chamber 60. The first and second pressure chambers, 58 and 60 respectively, are connected by means of a connections 70 to an expansion reservoir 72. The second pressure chamber 60 of the master cylinder 56 is hydraulically connected to the connection 38 of the control chamber 18 of the restriction valve 2 by means of a control line 74.

The pressure chamber 4 of the restriction valve 2 is hydraulically connected at its connection 54 by means of a pressure line 76 to the discharge of a hydraulic pump 78 whose inlet is connected by means of a suction line 80 to a reservoir 82 for the hydraulic fluid and causes the fluid to be forced through the restriction gap 12 in the non-muscular-energy-assisted mode of brake operation. A check valve 84 is interposed in the pressure line 76 to prevent the hydraulic fluid from flowing back in the direction of the hydraulic pump 78. A pressure line 86 branches off from the pressure line 76 between the check valve 84 and the pressure chamber 4 of the restriction valve 2. This pressure line 86 leads to the brake caliper 14. The brake caliper 14—a floating caliper is shown here—has a piston-cylinder apparatus 88 with a pressure chamber 90 in which a piston 92 is guided and hydraulically sealed. The pressure chamber 90 is connected to the pressure line 86, so that the piston 92 can have the dynamic pressure generated by means of the hydraulic pump 78 and controlled by the restriction valve 2 applied to it. In addition, the brake caliper 14 is provided with brake linings 94 which, in the customary manner, are pressed against a brake rotor 96 when pressure is applied to the piston-cylinder apparatus 88 by means of the piston 92.

The drain chamber 20 of the restriction valve 2 is connected to a reservoir 82 by means of a return line 98. A pressure hold valve 100, which is preloaded in the direction of the drain chamber 20, is optionally provided in the return line 98 depending on the spatial arrangement of the reservoir 82.

Finally, a brake pedal switch 102, which is mechanically actuated by the brake pedal 62, and/or an electrohydraulic pressure switch 104 is interposed in the control line 74. The function of this pressure switch 104 will be described in greater detail below.

The result is that the hydraulic pump 78, the pressure line 76, the restriction valve 2, which is connected to the reservoir 82 by means of the return line 98, the pressure line 86, and the piston-cylinder apparatus 88 of the brake caliper 14 form a non-muscular-energy-assisted brake circuit A having an integrated residual braking function achieved by means of the closable valve plunger 6, which can be controlled electromagnetically by means of the solenoid coil 34 or by means of a hydraulic control circuit B, which is hydraulically separated from the non-muscular-energy-assisted brake circuit A, and which is comprised of the plunger 68 of the master cylinder 56, the second pressure chamber 60 of the master cylinder 56, the control line 74, the control chamber 18 of the restriction valve 2 and the control plunger 24 of the restriction valve 2.

At this point it should be noted that FIG. 1 only shows a valve apparatus of the invention for controlling the piston-cylinder apparatus 88 of the brake caliper 14 for one wheel of the vehicle. Controlling of the piston-cylinder apparatuses of additional calipers for additional vehicle wheels can be accomplished in a corresponding manner by means of additional valve apparatuses of the invention connected by means of a branch (not shown) in control line 74 to the second pressure chamber 60 of the master cylinder 56 or by means of a control line 74' to the first pressure cylinder chamber 58 of the master cylinder 56, as will be explained in greater detail below. Of course, hydraulic control of the valve apparatus of the invention can also be accomplished by means of a single-chamber master cylinder. The same holds true for the second typical embodiment of the invention shown in FIG. 2.

The operation of the first typical embodiment of the valve apparatus of the invention is described below.

After the brake pedal 64 is depressed, the plungers 66, 68 of the master cylinder 56 are moved to the right into the pressure chambers 58, 60 in FIG. 1 and close the connections 70 to the expansion reservoir 72, so that a pressure is produced in the pressure chambers 58, 60. This pressure is proportional to the actuating force applied to the brake pedal 62. It is also applied by means of the control line 74 in the control chamber 18 of the restriction valve 2 as a control pressure in hydraulic control circuit B for the non-muscular-energy-assisted brake circuit A.

The control pressure which is present in the control chamber 18 of the restriction valve 2 now moves the control plunger 24 (to the right in FIG. 1) as a consequence of the application of pressure to cross-sectional surface area of the valve pin 28 corresponding to the hydraulic effective surface area of the control plunger 24, and thus the valve body 10 which is held against the control plunger 24 by the force of the return string 46 is moved in the direction of the valve sealing seat 44 on the through-hole 8 of the valve plunger 6. This hydraulic control of the restriction valve 2 by means of the hydraulic control circuit B is identical in non-muscular-energy-assisted brake operation and when the non-muscular-energy assistance fails.

In non-muscular-energy-assisted brake operation, the hydraulic pump 78 is started by means of the pedal switch 102 actuated by the brake pedal 62 or by means of the electrohydraulic pressure switch 104 when a preset signal pressure is exceeded in hydraulic control circuit B. For this purpose the pedal switch 102 or the electrohydraulic pressure switch 104 supplies an electrical signal which starts an electric motor (not shown) connected on the output side to the hydraulic pump 78 or engages an electromagnetic clutch (not shown) which connects the hydraulic pump 78 to a rotating shaft of the engine or to a vehicle wheel. However, the hydraulic pump could also be operated during the entire time the vehicle is in operation.

The hydraulic pump 78 now draws the hydraulic fluid out of the reservoir 82 by means of the suction line 80 and pumps it through the check valve 84 and the pressure line 76 into the pressure chamber 4 of the restriction valve 2. From the pressure chamber 4 the hydraulic fluid flows through the through-hole 8 in the valve plunger 6 through the restriction gap 12 into the drain chamber 20 and from there via the return line 98 as well as the pressure hold valve 100 back into the reservoir 82. Since at the beginning of the actuation of the brake pedal 62 the control plunger 24 of the restriction valve 2 and thus the valve body 10 are only moved a small distance in the direction of the sealing seat 44 on the valve plunger 6, so that the restriction gap 12 is nearly all the way open, the hydraulic pump 78 recirculates the hydraulic fluid in a largely non-pressurized manner through the restriction valve 2.

The valve body can is now moved by means of the valve pin 28 of the hydraulically loaded control plunger 24 in opposition to the force of the return string 46 further in the direction of the sealing seat 44 with a force which is equal to the product of the control pressure applied in the control chamber 18 by the master cylinder 56 and the hydraulic effective surface area of the control plunger 24, which is governed by the cross-sectional surface area of the valve pin 28. When the valve body 10 approaches the sealing seat 44, the restriction gap 12 is reduced, which reduces the flow cross section for the hydraulic fluid which is being circulated by the hydraulic pump 78 by means of the pressure line 76 and the pressure chamber 4. As a result, a dynamic pressure is produced in front of the restriction gap 12 (relative to the direction of flow of the hydraulic fluid) in the non-muscular-energy-assisted brake circuit A. This dynamic pressure is passed on through the pressure chamber 4, the pressure line 76, and the pressure line 86 to the pressure chamber 90 of the piston-cylinder apparatus 88 of the brake caliper 14, so that a braking force is applied to the brake rotor 96 through the piston 92 of the piston-cylinder apparatus 88 and the brake linings 94.

The dynamic pressure produced ahead of the restriction gap 12 is essentially dependent on the automatic flow of the hydraulic pump 78 and the flow resistance of the restriction valve 2, however it is approximately proportional to the control pressure which is present in the control chamber 18 of the restriction valve 2. The proportionality factor between this control pressure and the dynamic pressure generated ahead of the restriction gap 12 is determined by the ratio of the hydraulic effective area of the control plunger 24 in the control chamber 18, in other words the cross-sectional surface area of the valve pin 28, to the effective hydraulic area of the valve body 10 when it is in contact with the sealing surface 44. The desired pressure boost in non-muscular-energy-assisted brake circuit A can be adjusted by dimensioning these effective surfaces appropriately. The reaction force applied to the valve body 10 by the dynamic force can also be adjusted by means of the effective hydraulic surface area of the valve body 10 so that an appropriate feedback of the dynamic pressure to the brake pedal 62 is provided by means of the pressure head in hydraulic control circuit B between the control plunger 24 of the restriction valve 2 and the second piston 68 of the master cylinder 56 as well as the closed pressure head between the second piston 68 and the first piston 66 of the master cylinder 56. This results in good pedal feel and therefore allows the brake pedal 62 to be depressed in such a way that the driver has a good sense of what is going on. Since the restriction gap 12 of the restriction valve 2 is continuously being adjusted and since in the non-muscular-energy-assisted braking mode it is not completely closed in opposition to the dynamic pressure, in particular, no closed-loop control spikes, which could feed back to the brake pedal 62, are produced. It must be noted that when the dynamic pressure is generated by the hydraulic pump 78 in the pressure chamber 4 of the restriction valve 2, the valve plunger 6 always tends to remain abutted against the step 42 since the pressure-chamber-side hydraulic effective surfaces of the valve plunger 6 which have the dynamic pressure applied to them are larger than the drain-chamber-side hydraulic effective surface areas of the valve plunger 6, which are only partially exposed to the lower pressure in the drain chamber 20, so that a resulting force in the direction of the drain chamber remains and is added to the spring force of the plunger spring 52.

If the brake pressure is now to be reduced in non-muscular-energy-assisted brake operation, the control pressure in hydraulic control circuit B is decreased by reducing the force of the brake pedal 62 and the control plunger 24 of the restriction valve 2 travels back to its initial position together with the valve body 10, thus enlarging the restriction gap 12. When this occurs, the control plunger 24 has the dynamic pressure of the circulating hydraulic fluid in the pressure chamber 4 (this dynamic pressure is reduced by the enlargement of the restriction gap 12) and the force of the return string 46 applied to it in opposition to the decreasing control pressure in the control chamber 18 applied through the valve body 10. The hydraulic pump 78 or its drive is turned off when the pedal switch 102 which is activated by the brake pedal 62 falls back into the off position or when the signal pressure in the hydraulic control circuit the falls below the predetermined level at the electrohydraulic pressure switch 104, thus stopping the circulation of the hydraulic fluid and causing the brake pressure to drop to zero.

If the non-muscular-energy-assistance fails, for example, as a consequence of a failure of the hydraulic pump 78 or leaks in the non-muscular-energy-assisted brake circuit A, the required residual braking force can be applied with adequate feedback to the brake pedal 62 by means of the valve plunger 6. When this occurs, the valve body 10, which has force applied to it hydraulically, travels the closing distance s of the restriction gap 12 against the force of the return spring 46 and hydraulically closes the through-hole 8 in the valve plunger 6 tightly against the sealing seat 44, so that further movement of the closed valve plunger 6 via the valve body 10 and the control plunger 24 in the control chamber 4 generates a residual brake pressure. The residual brake pressure is propagated through the pressure line 86 to the piston-cylinder apparatus 88 in the brake caliper 14, so that a residual braking force is applied via the piston 92 and the brake linings 94 to the brake rotor 96. The maximum possible effective travel of the valve apparatus in applying the residual brake pressure is equal to the travel 1 of the valve plunger 6. If the non-muscular-energy-assistance fails, it is of particular advantage when the residual brake pressure in pressure chamber 4 is applied that the valve body 10 is a ball, since the valve body 10 can automatically center itself on the annular sealing seat 44 of the valve plunger 6 and thus reliably seal the through-hole 8 off from the drain chamber 20.

When an anti-locking brake system (ABS) is present, the valve apparatus of FIG. 1 operates as follows. The operating principle of the anti-brake locking system is that when a certain deceleration threshold is exceeded on a brake wheel when brake pressure is applied in a braking operation, the wheel brake pressure is lowered until the acceleration falls below a second acceleration threshold at this wheel. To accomplish this, it may be necessary to reduce the brake pressure applied at the wheel to zero. The brake pressure at the wheel is then increased again until the wheel is once again over-braked or until the brake pressure output by the driver is once again reached. To accomplish this, the control plunger 24 is additionally controlled electromagnetically by means of the armature 26 and the solenoid coil 34.

In ABS operation, if braking is initiated by the brake pedal 62, a sensing system (not shown) detects if the braking pressure applied to the wheel via non-muscular-energy-assisted brake circuit A in the brake caliper 14 overbrakes the wheel (not shown). The brake pressure is now adjusted by controlling the solenoid drive, which consists of the armature 26 and the solenoid coil 34, as needed. The magnetic force is applied to the armature 26 (to the left in FIG. 1) and therefore in opposition to the force which corresponds to the product of the cross-sectional area of the valve pin 28 and the control pressure which is present in the control chamber 18. This reduces the resulting force, which is applied by the valve pin 28 to the valve body 10 (to the right in FIG. 1). In extreme cases, this resulting force can be reduced to zero by increasing the magnetic force by means of the infinitely adjustable supply of current to the solenoid coil until it compensates for the force applied to the control plunger 24 by means of the hydraulic control pressure. As a consequence, the valve body 10, which is acted upon by the return string 46 and the applied dynamic pressure, is moved to the left in FIG. 1 in the direction of sealing seat 44, and the restriction gap is reduced. As a consequence, the dynamic pressure produced by the pressure line 86 in the pressure chamber 90 of the piston-cylinder apparatus 88 is reduced until the acceleration falls below the deceleration threshold.

Thereupon, the electromagnetically control of the restriction valve 2 is reduced so that the resulting force which is applied to the right in FIG. 12 the valve body 10 by means of the valve pin 28 increases once again. As a consequence, the valve body 10 is pushed to the right in FIG. 1 in the direction of the sealing seat 44, and the restriction gap 12 is reduced. This once again increases the dynamic pressure produced in the pressure chamber 90 of the piston-cylinder apparatus 88 by means of the pressure line 86 until the wheel is overbraked or the restriction gap 12 alone is once again adjusted solely by means of the hydraulic control circuit B, as described above, and a braking force which is proportional to the activation force, is applied in the brake caliper 14 by the non-muscular-energy-assisted brake circuit A. A closed-loop control operation takes place during the entire ABS-controlled braking operation.

This control process takes place without a significant change in the control pressure in the control chamber 18 of the hydraulic control circuit B since, as a consequence of the low travel s, the change in the volume of the fluid in control chamber 18 caused by the movement of the control plunger 24 is for the most part taken up by elastic deformation of the sealing elements which are present.

In the embodiment of the valve apparatus described above, it is especially advantageous that no undesirable pressure pulsation which could feed back to the brake pedal 62 as closed-loop control pressure spikes is produced in hydraulic control circuit B in ABS control, so that the good pedal feel is achieved when the hydraulic brake system is in ABS mode.

The reduction of brake pressure in ABS mode takes place in the valve apparatus in the same manner as in non-muscular-energy-assisted brake operation without additional closed-loop control, so that the reader is referred at this point to the explanations provided above.

Figure 2:
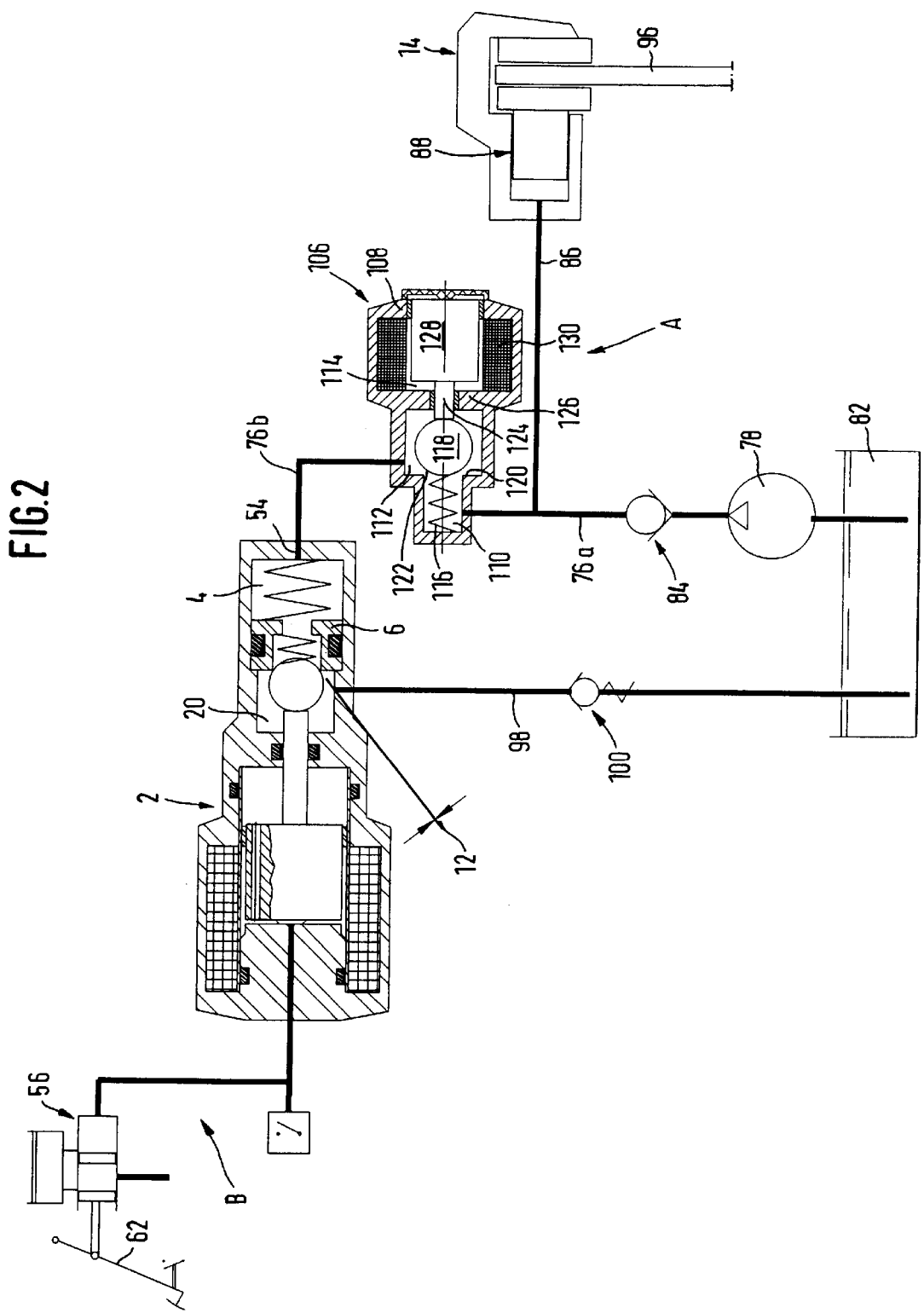
FIG. 2 is a schematic diagram of a second typical embodiment of the valve apparatus of the invention which, compared to the first typical embodiment, has an additional electromagnetically controlled restriction valve for an anti-spin control system (ASC) or for a vehicle dynamics control system.

In the second typical embodiment of the invention shown in FIG. 2, the valve apparatus of FIG. 1 is provided with an additional electromagnetically controllable restriction valve 106, so that an anti-spin control system (ASC) or a vehicle dynamic control system can be implemented. The parts corresponding to the parts in FIG. 1 are provided with the same reference numbers, and therefore they will not be explained once more below. FIG. 2 shows the valve apparatus in the idle state augmented by the restriction valve 106, whereby the restriction gap 12 of the restriction valve 2 is in fact opened to the maximum position.

An anti-slip control system basically operates as follows: If, for example, the coefficients of friction of the driven wheel relative to the road surface are too low when the vehicle is accelerated, i.e. if an acceleration threshold is exceeded, this wheel is braked until the value falls below a second acceleration threshold, so that the wheel once again rotates in an acceptable slip range. In a vehicle dynamics control system, which basically is designed to maintain the longitudinal stability of the vehicle, which is measured by the yaw angle between the longitudinal axis of the vehicle and the momentary direction of travel in critical operating states, for example in the case of understeering, oversteering or braking during rapid turning maneuvers, the yaw moments, which could cause the vehicle to skid or spin out are corrected, by braking one or more wheels or by other means.

For such control to be achieved, it must be possible to modulate the brake pressure at the individual wheels. This is accomplished with the aid of the restriction valve 2 described above and the additional restriction valve 106, which are provided for each wheel.

Like the restriction valve 2, the additional restriction valve 106 has a 3-chamber valve housing 108, which defines a pressure chamber 110, the drain chamber 112, and a control chamber 114. A return string 116 for the circle valve body 118 located in the drain chamber 112 is provided in the pressure chamber 110. The valve body 118 works together with an annular sealing seat 120 located in the valve housing 108 to form a restriction gap 122. The valve body 118 is pressed against a valve pin 124 by the return string 116. The valve pin 124 extends through and is sealed by a wall 126 between the drain chamber 112 and the control chamber 114. The valve pin 124 in the control chamber 114 is connected to an armature 128 which can be moved in an axially defined manner by means of a solenoid coil 130 in order to adjust the restriction gap 122 in opposition to the force of the return string 116 by means of the valve pin 124 and the valve body 118. For this purpose, the solenoid drive, which is comprised of armature 128 and solenoid coil 130 is designed as a proportional solenoid having an appropriate current/force curve. The valve pin 124 in the control chamber 114 is connected to an armature 128 which can be moved in an axially defined manner by means of a solenoid coil 130 in order to adjust the restriction gap 122 in opposition to the force of the return string 116 by means of the valve pin 124 and the valve body 118. The valve body 118 can therefore be moved in a load-dependent manner by means of the solenoid drive, whereby the restriction gap 122 of the restriction valve 106 is reduced when current is applied to the solenoid drive and the force is increased, respectively, and the gap is increased when current is removed in response to the force of the return string 116 and the pressure prevailing in the pressure chamber 110, which acts on the valve body 118.

The additional restriction valve 106 differs from the restriction valve 2 essentially in that a valve plunger is not provided and the restriction gap 122 is adjusted solely by electromagnetic means utilizing the solenoid drive. Accordingly, the armature 128 in the control chamber 114 must have only one range of travel corresponding to the closing distance of the restriction gap 122.

The additional restriction valve 106 is interposed in the non-muscular-energy-assisted brake circuit A behind the branch in the pressure line 86 from pressure line 76 into pressure line 76 starting at the hydraulic pump 78, thus separating pressure line 76 into two pressure line sections 76a and 76b. The first pressure line section 76a connects the pressure chamber 110 of the additional restriction valve 106 to the hydraulic pump 78 by means of the check valve 84, while the second pressure line section 76b connects the drain chamber 112 of the additional restriction valve 106 to the pressure chamber 4 of the restriction valve 2 via the connection 54 of the restriction valve 2.

When the valve apparatus shown in FIG. 2 is used with an appropriate sensing system, excessive or incorrect responses by the driver made when driving the vehicle can be compensated for automatically before the driver, realizing the critical condition of the vehicle, depresses the brake pedal 62. The additional restriction valve 106 is controlled independently of restriction valve 6 by the solenoid drive comprising an armature 128 and solenoid coil 130, which causes the restriction gap 122 to be reduced in a defined manner. At the same time, the hydraulic pump 78 is actuated by the sensing system if it is not already running. A dynamic pressure is produced at the restriction gap 122, around which hydraulic fluid is forced, of the additional restriction valve 106; this dynamic pressure is propagated through the pressure chamber 110 of the additional restriction valve 106, the pressure line section 76a and the pressure line 86 to the piston-cylinder apparatus 88 of the brake caliper 14, so that a defined braking force is applied to the brake rotor 96 independently of restriction valve 2. The hydraulic fluid is pumped from the drain chamber 112 of the additional restriction valve 106 through the pressure line section 76b, the pressure chamber 4 of the restriction valve 2, the opened restriction gap 12 of the restriction valve 2, the drain chamber 20 of the restriction valve 2, the return line 98 as well as the pressure hold valve 100 back into the reservoir 82. This regulating process is once again advantageously performed free of feedback, i.e. the closed-loop control processes cannot be felt at the brake pedal 62.

Figure 3:
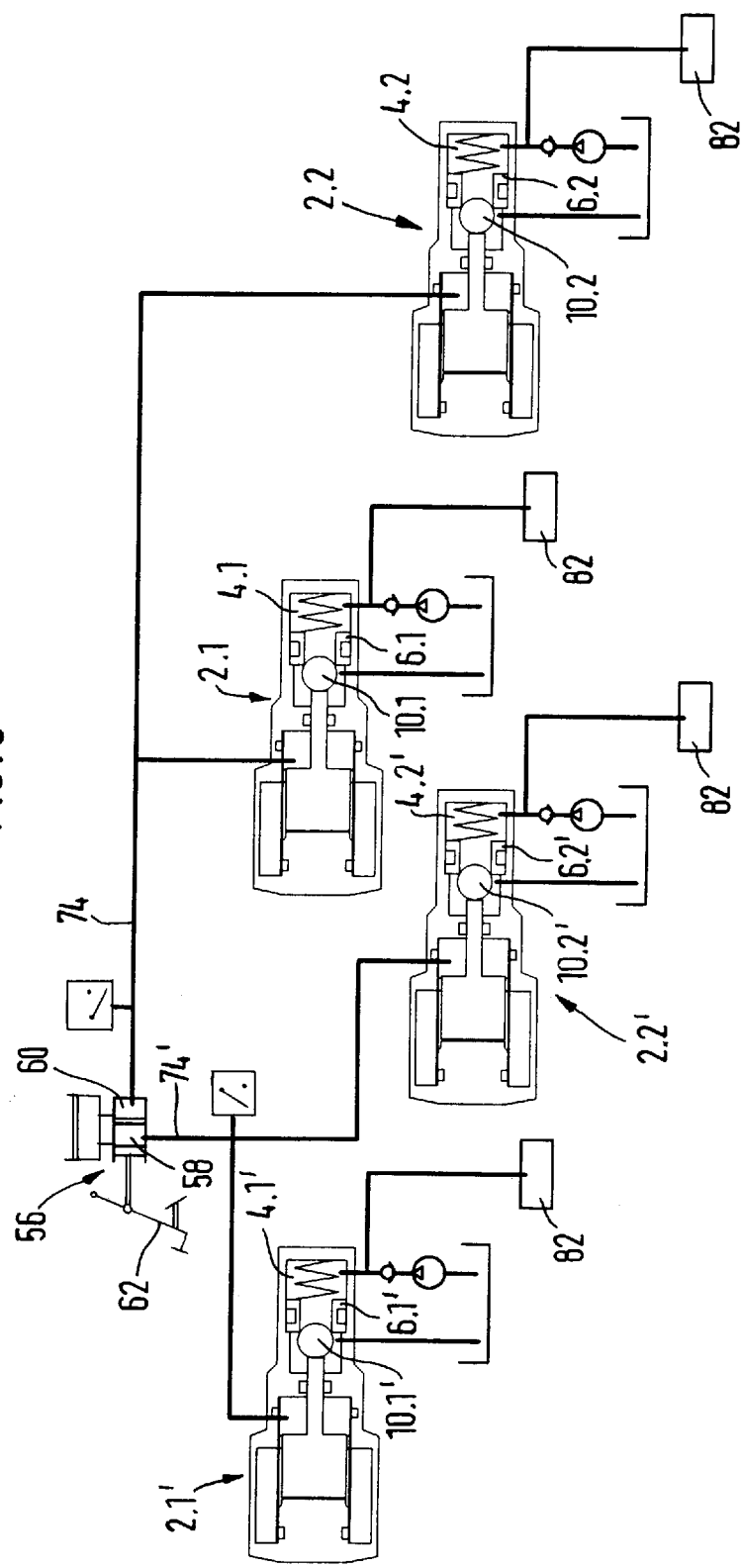
FIG. 3 is a circuit arrangement of 4 valve apparatuses of the invention in a hydraulic non-muscular energy-assisted brake system for 4-wheel automotive vehicles.

FIG. 3 shows a possible arrangement of four valve apparatuses of the invention each having a restriction valve 2.1, 2.2, 2.1', 2.2' in a hydraulic non-muscular-energy-assisted brake system for 4-wheel automotive vehicles. Each of these restriction valves corresponds to the restriction valve 2 described in FIG. 1 in terms of design and function. The parts corresponding to the parts in FIG. 1 are provided with the same reference numbers, and will not be explained further. FIG. 3 shows the hydraulic non-muscular-energy-assisted brake system in the idle state, whereby the restriction gaps of restriction valves 2.1, 2.2, 2.1', 2.2' are in fact all open to the maximum opening distance.

In this arrangement two valve apparatuses having restriction values 2.1 and 2.2 are interposed in parallel in the control line 74, which is connected to the second pressure chamber 60 of the master cylinder 56, while two valve apparatuses having restriction values 2.1' and 2.2' are interposed in parallel in the control line 74', which is connected to the second pressure chamber 58 of the master cylinder 56 so the restriction valves 2.1, 2.2, 2.1', 2.2' can be controlled in the manner described with reference to FIG. 1 by operating the brake pedal. In addition, a brake caliper (not shown) is connected to each of the pressure chambers 4.1, 4.2, 4.1', 4.2' of the restriction valves 2.1, 2.2, 2.1', 2.2'.

In non-muscular-energy-assisted brake operation, the generation of the residual brake pressure upon failure of the non-muscular-energy assistance by means of the valve plungers 6.1, 6.2, 6.1', 6.2' as well as the anti-locking brake control (ABS) take place as described with reference to FIG. 1. The four valve apparatuses can also be supplemented by an additional restriction valve (not shown) so that an anti-spin control system (ASC) and/or a vehicle dynamics control system corresponding to the descriptions made with reference to FIG. 2 can be implemented.

Because of the compact design of the valve apparatus of the invention, this apparatus is especially well suited for use in motorcycles. On motorcycles, a single-chamber master cylinder is generally used instead of a 2-chamber master cylinder to control the front wheel brake, and a single-chamber master cylinder is provided to control the rear wheel brake. These single-chamber master cylinders then each control one valve apparatus of the invention as shown in FIG. 1 or FIG. 2, so that non-muscular-energy-assisted brake operation, the generation of a residual brake pressure in the event of failure of non-muscular-energy assistance, an anti-locking brake control system (ABS) or an anti-slip control system (ASC) can be implemented in a manner analogous to the descriptions above. A vehicle dynamics control system cannot be implemented on motorcycles since the yaw moments cannot be influenced by the brake system.

Figure 4:
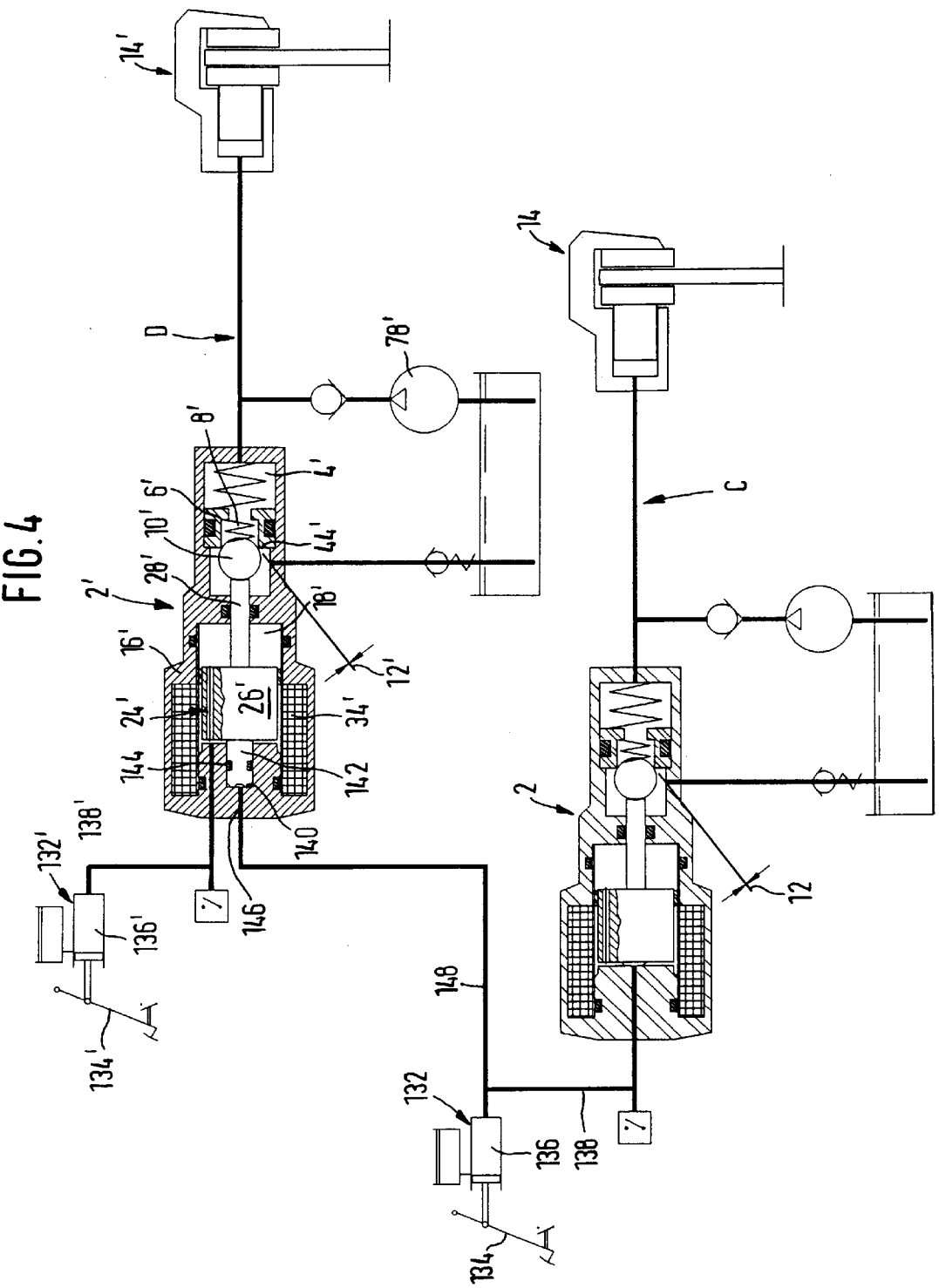
FIG. 4 is a circuit arrangement of 2 valve apparatuses of the invention in a hydraulic integral brake system with an anti-locking brake system (ABS) for motorcycles.

FIG. 4 shows an arrangement of two valve apparatuses of the invention in a hydraulic integral brake system having anti-blocking brake control for motorcycles. The parts corresponding to the parts in FIG. 1 have been given the same reference numbers and therefore will not be described further below. FIG. 4 shows the hydraulic integral brake system in the idle state. In it, the restriction gaps 12, 12' of restriction valves 2, 2' are in fact opened to the maximum distance.

In motorcycles, as in 4-wheel vehicles, two separate brake circuits are generally provided, one for the front wheel and one for the rear wheel. Single-chamber or single-circuit master cylinders are used to control the front wheel and the rear wheel brake circuits, respectively. Because of the uneven distribution of braking load on motorcycles, most of the required braking force is generally applied via the front wheel, and as a consequence, in actual practice braking by means of the rear wheel brake circuit is ignored, and the braking force which can be applied to the rear wheel for an optimal braking operation is largely unused. In such cases, hydraulic integral brake systems in which one of the brake circuits is controlled by the other brake circuit are of assistance.

In FIG. 4 the front wheel brake circuit C has a single-chamber master cylinder 132 which can the actuated by a brake lever 134 and which has a pressure chamber 136. A valve apparatus of the invention having restriction valve 2 is connected to the pressure chamber 136 via a control line 138. The restriction valve 2 is constructed and operates as described with respect to FIG. 1. At the same time, the rear wheel brake circuit D has a single-chamber master cylinder 132', which can be actuated by a brake lever 134' and which has a pressure chamber 136'. The valve apparatus of the invention having a restriction valve 2' is connected to the pressure chamber 136' by means of the control line 138'. The restriction valve 2' is essentially constructed and essentially functions as described with reference to FIG. 1.

The restriction valve 2' differs from the restriction valve 2 shown in FIG. 1 only in that an additional input control chamber 140 is provided on the control-chamber-side of the valve housing 16'. An input control plunger 142 is held in the control chamber 130 such that it is free to slide. A sealing element 144 is located on the control plunger 142. This sealing element 144 seals the control chamber 140 off from the control chamber 18' of the restriction valve 2'. The control plunger 24' can be mechanically operated by the input control plunger 142 if a control pressure has been established in the input control chamber 140. Finally, the input control chamber 140 has a connection 146 by which it is connected to a control line 148 which branches off from the control line 138 of the front wheel brake circuit C.

If the master cylinder 132 of the front wheel brake circuit C is now operated, the input control plunger 142, which is also hydraulically controlled by the control lines 138 and 148, moves the control plunger 24' in the restriction valve 2' of the rear wheel brake circuit D and thus moves the valve body 10' at the same time as the control pump 78' begins to run in the direction of the sealing seat 14' on the through-hole 8' of the valve plunger 6', so that a dynamic pressure is generated by the reduction in the size of the restriction gap 12' in the pressure chamber 4', and the dynamic pressure is applied at the brake caliper 14'. Corresponding to the translation ratio of the hydraulic effective surface area on the input control plunger 142 relative to the hydraulic effective surface area of the valve body 10' on the sealing seat 44', a brake pressure which is proportional to the pressure in the pressure chamber 136 of the master cylinder 132 in the front wheel brake circuit C is applied to the brake caliper 14' of the rear wheel brake circuit D to generate a brake force. This is accomplished without actuating the master cylinder 132' of the rear wheel brake circuit D.

If the brake pressure applied to the brake caliper 14' of the rear wheel brake circuit D is so high that the sensing system detects that the rear wheel is exhibiting a tendency to lock, an anti-blocking control operation is performed in the rear wheel brake circuit D as described with reference to FIG. 1. When this is done, the solenoid drive, which comprises armature 26' and solenoid coil 34', pulls the control plunger 24' and thus the valve body 10' away from the sealing seat 44' of the valve plunger 6' in a direction opposite the control pressure applied to the input control plunger 142 in the input control chamber 140, and the input control plunger 142 travels back in the input control chamber 140 until the dynamic pressure, which is reduced by the increasing valve gap 12' of the restriction valve 2' is matched to the requirements.

If during a braking operation both master cylinders 132, 132' are actuated, only the larger control pressure of the two becomes active at the control plunger 24' of the restriction valve 2' as a consequence of the application of pressure to the control chamber 18' or the application of force by means of the input control plunger 142. This is due to the fact that the input control plunger 142 is actuated on the one hand by the input control chamber 140 with the control pressure of the master cylinder 132 of the front wheel brake circuit C, while on the other hand the control pressure of the master cylinder 132' of the rear wheel brake circuit the acts on the input control plunger 142 via the control chamber 18' of the restriction valve 2', and the control pressure in the control chamber 18' continues to act on the valve pin 28'. At the valve body 10', a force equal to the product of the difference between the control pressures and the hydraulic effective surface area of the input control plunger 142 now acts on the valve body 10' via the valve pin 28', provided that this difference is positive, and a force equal to the product of the control pressure in the control chamber 18' and the cross-sectional surface area of the valve pin 28' also acts on the valve body 10'. A brake pressure is applied at the brake caliper 14' in the rear wheel brake circuit D by means of the closing movement of the valve gap 12' of the restriction valve 2' caused by the above action. If this brake pressure is too high, which is detected by means of the sensing system, an anti-blocking control operation occurs as already described.

The valve apparatuses of the invention shown in FIG. 1 can also be enhanced to include additional restriction valves as shown in FIG. 2 to permit the implementation of an anti-slip control system (ASC). Direct, i.e. mechanical, control of the control plunger 24' via the brake lever 134' is also theoretically possible. To accomplish this, the control plunger 24' must have a pin shoulder (not shown) which is hydraulically sealed from its surroundings by the housing wall of the valve housing 16'.

The valve apparatus for a non-muscular-energy-assisted brake circuit of a hydraulic brake system is disclosed. It has a restriction valve whose valve body limits a restriction gap through which hydraulic fluid is forced in non-muscular-energy-assisted brake operation in order to set a defined dynamic pressure in a pressure chamber which can be applied to a tensioning means, in which a valve plunger having a through-hole is placed. If the non-muscular-energy-assisted brake assistance fails, the valve plunger can be moved by the valve to generate a residual brake pressure in the pressure chamber via the valve body whereby the through-hole is closed. Since the restriction gap is present at the through-hole, an extremely compact valve apparatus is created in which the valve body not only limits the restriction gap but also serves as a sealing closure element for the through-hole and serves to control the valve plunger directly, while the brake pressure in the pressure chamber is present directly at the valve body at all times, and thus can easily be fed back to the brake pedal.

Although the present invention has been described with reference to specific embodiments, those of skill in the art will recognize that changes may be made thereto without departing from the scope and spirit of the invention as set forth in the appended claims.

What is claimed is:

1. An apparatus for non-muscular-energy assisted brake circuit of a selectively operable hydraulic brake system, the apparatus comprising:

a restriction valve having a valve body to set a defined dynamic pressure in a pressure chamber;

a valve plunger held in a pressure chamber, with the valve plunger having a though-hole;

means for generating a braking force in response to the defined dynamic pressure in the pressure chamber;

a variable restriction gap formed at the through-hole of the valve plunger, with the restriction gap having hydraulic fluid forced through the gap when the non-muscular-energy assist brake circuit is in a non-muscular-energy assisted brake mode, and with the valve plunger being moved and the through-hole being closed to generate a residual brake force in the pressure chamber by using the valve body in the event of a failure of non-muscular-energy assist circuit; and means for adjusting the restriction gap during the operation of the hydraulic brake system.

2. The valve apparatus of claim 1, wherein the valve body of the restriction valve is hydraulically and electromagnetically controlled to adjust the restriction gap.

3. The valve apparatus of claim 2, wherein the restriction valve further comprises:

an input control chamber;

an input control plunger constructed and arranged in the input control chamber so that the input control plunger can slide, the valve body being mechanically moveable to adjust the restriction gap.

4. The valve apparatus of claim 1 wherein the restriction valve further comprises:

a ball seat valve having a spherical valve body; and an annular sealing seat constructed and arranged to cooperate with the spherical valve body to limit the restriction gap at the through-hole of the valve plunger.

5. The valve apparatus of claim 1, wherein the restriction valve further comprises:

a valve housing including the pressure chamber and a drain chamber which is separated by the valve plunger from the pressure chamber, the valve body being held in the drain chamber, such that in non-muscular-energy-assisted brake operation, the pressure chamber hydraulically communicates with the drain chamber solely via the through-hole in the valve plunger.

6. The valve apparatus of claim 5, wherein the valve housing of the restriction valve further comprises:

a control chamber separated in a hydraulically sealed manner from the drain chamber, the control chamber holding a hydraulically and electromagnetically controllable control plunger, having hydraulic fluid essentially flowing around all sides of it in the control chamber, the control chamber having a valve pin which is sealed from the control chamber and extends into the drain chamber effectively communicating with the valve body, so that the restriction gap of the restriction valve is adjusted hydraulically by the control plunger and can be opened electromagnetically essentially without a change in pressure in the control chamber.

7. The valve apparatus of claim 1 further comprising:

a further restriction valve located ahead of the pressure chamber of the restriction valve relative to the direction of flow of the hydraulic fluid, the further restriction valve having a restriction gap independently adjustable of the restriction valve by electromagnet means, in order to generate the defined dynamic pressure applied to the means for generating a braking force.

\* \* \* \* \*